(12) United States Patent
Rong et al.

(10) Patent No.: US 10,136,440 B2
(45) Date of Patent: Nov. 20, 2018

(54) SYSTEM AND METHOD FOR POWER INDICATIONS

(71) Applicant: Futurewei Technologies, Inc., Plano, TX (US)

(72) Inventors: Zhigang Rong, San Diego, CA (US); Yunsong Yang, San Diego, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 69 days.

(21) Appl. No.: 15/354,210

(22) Filed: Nov. 17, 2016

(65) Prior Publication Data

US 2017/0201995 A1    Jul. 13, 2017

Related U.S. Application Data

(60) Provisional application No. 62/276,632, filed on Jan. 8, 2016.

(51) Int. Cl.
| | |
|---|---|
| *H04W 4/00* | (2018.01) |
| *H04W 72/04* | (2009.01) |
| *H04B 17/318* | (2015.01) |
| *H04W 52/24* | (2009.01) |
| *H04W 88/08* | (2009.01) |

(52) U.S. Cl.
CPC ...... *H04W 72/0473* (2013.01); *H04B 17/318* (2015.01); *H04W 52/245* (2013.01); *H04W 88/08* (2013.01)

(58) Field of Classification Search
CPC .......... H04W 72/0473; H04W 52/245; H04W 88/08; H04B 17/318
See application file for complete search history.

(56) References Cited

U.S. PATENT DOCUMENTS

| | | | | |
|---|---|---|---|---|
| 2006/0083206 | A1* | 4/2006 | Min | H04B 17/318 370/338 |
| 2013/0102345 | A1* | 4/2013 | Jung | H04B 7/0456 455/513 |
| 2017/0070934 | A1* | 3/2017 | Luo | H04W 36/18 |
| 2017/0289926 | A1* | 10/2017 | Sutskover | H04W 52/325 |
| 2017/0332407 | A1* | 11/2017 | Islam | H04W 52/242 |

FOREIGN PATENT DOCUMENTS

| | | |
|---|---|---|
| CN | 101394208 A | 3/2009 |
| CN | 101466138 A | 6/2009 |
| WO | 2012079362 A1 | 6/2012 |

* cited by examiner

*Primary Examiner* — Afshawn M Towfighi
(74) *Attorney, Agent, or Firm* — Futurewei Technologies, Inc.

(57) ABSTRACT

A wireless communications system includes an access point (AP) and multiple stations. The AP transmits a reference indicator indicating a target receive power reference of the AP and an adjustment indicator indicating an adjustment to the target receive power reference for a station. When the station receives the reference indicator and the adjustment indicator, the stations determines a transmission power level in accordance with the target receive power reference and the adjustment to the target receive power reference. The stations transmits a packet at the transmission power level to the AP. Reduction in signaling overhead is achieved.

18 Claims, 8 Drawing Sheets

SYSTEM AND METHOD FOR POWER INDICATIONS

CROSS-REFERENCE TO RELATED APPLICATION

This application claims the benefit of U.S. Provisional Application No. 62/276,632, filed on Jan. 8, 2016, entitled "System and Method for Transmit Power Control," which application is hereby incorporated herein by reference.

TECHNICAL FIELD

The present invention relates to digital communications, and, in particular embodiments, to a system and method for transmit power control.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, the density of devices in the WLANs (e.g., access points (APs) and stations (STA)) will also increase, especially in urban areas. High densities of APs (also commonly referred to as communications controller, controller, and the like) and stations (also commonly referred to as user, subscriber, terminal, and the like) tend to make WLANs less efficient, especially since the original WLANs were designed assuming a low density of APs and stations. As an example of inefficiency, a currently used enhanced distributed channel access (EDCA) based media access control (MAC) scheme generally does not work efficiently in an environment with high AP and station density.

SUMMARY

An embodiment method includes receiving, by a station, a reference indicator indicating a target receive power reference for an access point, receiving, by the station, an adjustment indicator indicating an adjustment to the target receive power reference, determining, by the station, a transmission power level in accordance with the target receive power reference and the adjustment to the target receive power reference, and transmitting, by the station, a packet at the transmission power level.

The method further includes receiving, by the station, a resource allocation indicator indicating a location of a network resource allocated to the station for transmitting the packet. The packet is transmitted by the station in the location of the network resource allocated to the station.

An embodiment method includes transmitting, by an access point (AP), a reference indicator indicating a target receive power reference of the AP, transmitting, by the AP, an adjustment indicator indicating an adjustment to the target receive power reference, and receiving, by the AP, a packet from the station.

The method further includes transmitting, by the AP, a resource allocation indicator indicating a location of a network resource allocated to a station for transmitting the packet. The packet is received by the AP in the location of the network resource allocated to the station.

An embodiment station includes a processor, and a computer readable storage medium storing programming for execution by the processor. The programming including instructions to configure the station to receive a reference indicator indicating a target receive power reference for an access point, receive an adjustment indicator indicating an adjustment to the target receive power reference, determine a transmission power level in accordance with the target receive power reference and the adjustment to the target receive power reference, and transmit a packet at the transmission power level.

The programming further including instructions to configure the station to receive a resource allocation indicator indicating a location of a network resource allocated to the station for transmitting the packet. The packet is transmitted in the location of the network resource allocated to the station.

An embodiment access point includes a processor, and a computer readable storage medium storing programming for execution by the processor. The programming including instructions to configure the AP to transmit a reference indicator indicating a target receive power reference of the AP, transmit an adjustment indicator indicating an adjustment to the target receive power reference, and receive a packet from the station.

The programming including instructions to configure the AP to transmit a resource allocation indicator indicating a location of a network resource allocated to a station for transmitting the packet. The packet is received in the location of the network resource allocated to the station.

By transmitting a reference indicator indicating a target receive power reference of the AP and an adjustment indicator indicating an adjustment to the target receive power reference, the signaling overhead involved in signaling the target UL receive power is reduced.

BRIEF DESCRIPTION OF THE DRAWINGS

For a more complete understanding of the disclosure, and the advantages thereof, reference is now made to the following descriptions taken in conjunction with the accompanying drawing, in which.

DETAILED DESCRIPTION OF ILLUSTRATIVE EMBODIMENTS

The making and using of the presently example embodiments are discussed in detail below.

Figure 1:
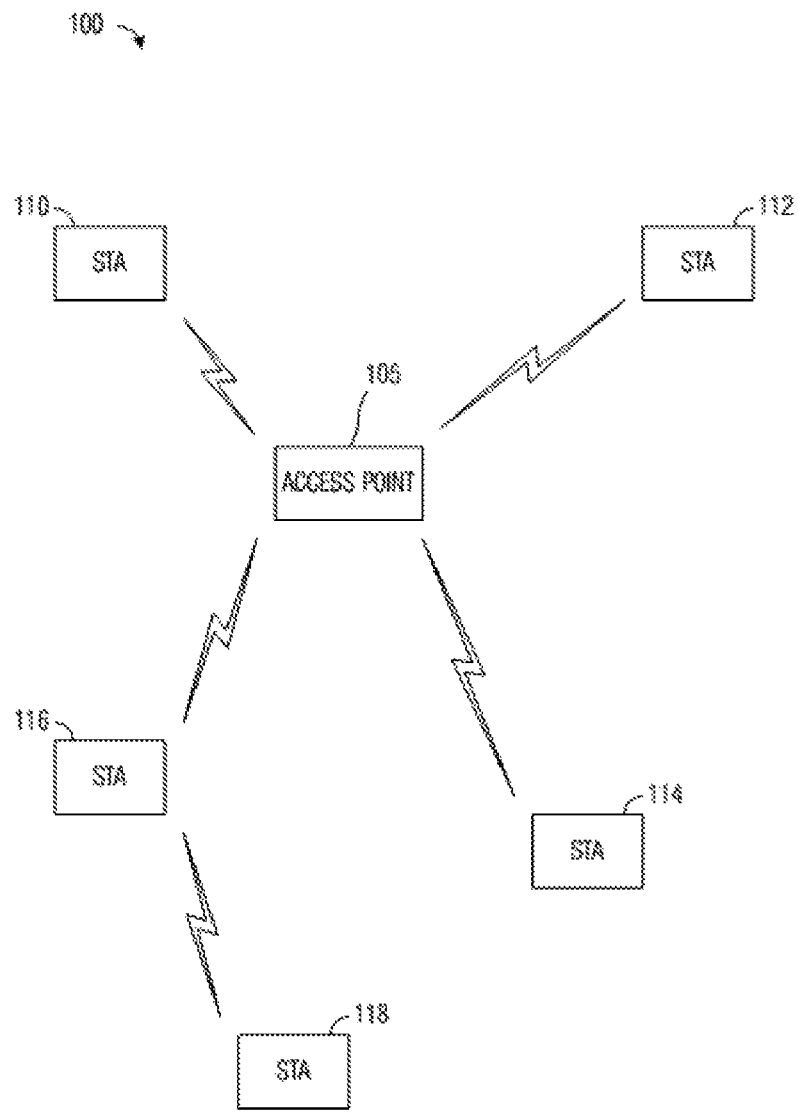
FIG. 1 illustrates an example wireless communications system.

FIG. 1 illustrates an example wireless communications system 100. Wireless communications system 100 includes an access point (AP) 105 that serves one or more stations, such as stations (STA) 110, 112, 114, and 116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118.

While it is understood that communications systems may employ multiple APs capable of communicating with a number of stations, only one AP, and a number of stations are illustrated for simplicity.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
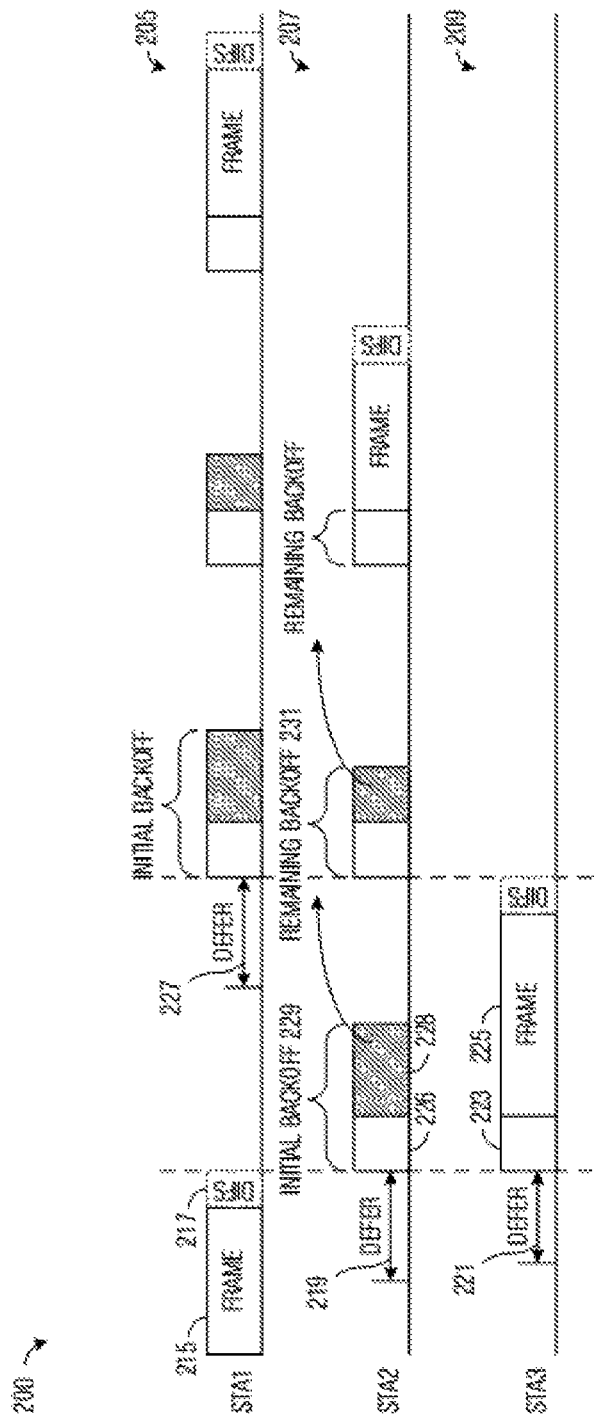
FIG. 2 illustrates a diagram of example channel access timing.

FIG. 2 illustrates a diagram 200 of example channel access timing. A first trace 205 represents channel access for a first station (STA1), a second trace 207 represents channel access for a second station (STA2), and a third trace 209 represents channel access for a third station (STA3). A short inter-frame space (SIFS) has a duration of 16 microseconds, a point coordination function (PCF) inter-frame space (PIFS) has a duration of 25 microseconds, while a distributed inter-frame space (DIFS) may last longer than either the SIFS or the PIFS. A backoff period may be a random duration. Therefore, active scanning may not provide the best solution when there are large numbers of stations attempting to perform AP/network discovery.

As shown in FIG. 2, STA1 is able to obtain access to the wireless channel and is able to transmit frame 215. While STA1 is transmitting frame 215, both STA2 and STA3 attempt to obtain access to the wireless channel, but since the wireless channel is busy, both defer (defer period 219 and defer period 221 respectively). Both STA2 and STA3 defer until one DIFS period 217 after the end of frame 215. Then STA2 and STA3 begin to contend for access to the wireless channel, by randomly selecting a backoff period to wait. After the random backoff period of a station expires, the station is permitted to contend for access to the wireless channel. As shown in FIG. 2, the random backoff period of STA3 is shorter (shown as period 223) than that of STA2, STA3 is able to obtain access to the wireless channel and transmits frame 225. During the random backoff period of STA2 (initial backoff 229), STA2 detects that the wireless channel becomes busy so STA2 stops counting down the random backoff period. The time interval between the start of the random backoff period of STA2 until when STA2 stops counting down (interval 226) plus the remaining backoff (interval 228) is referred to as an initial backoff 229. Similarly, while STA3 is transmitting, STA1 detects that the wireless channel is busy and defers (defer period 227) until one DIFS period after the end of frame 225. One DIFS period after the end of frame 225, both STA1 and STA2 begin their backoff, with STA2 continuing its previously stopped random backoff period and STA1 randomly selecting a backoff period to wait. The time interval between when STA2 resumes the countdown of the random backoff period and the end of the random backoff period is referred to as a remaining backoff 231. When remaining backoff 231 expires, STA2 is able to obtain access to the wireless channel and transmits a frame.

In cellular communications systems, e.g., Third Generation Partnership Project (3GPP) Long Term Evolution (LTE) compliant communications systems, OFDMA has been shown to be able to provide robust performance in high density environments. OFDMA has the ability to support multiple users simultaneously by carrying traffic from different users on different portions of the bandwidth of the communications system. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

Similarly, uplink multiuser multiple input multiple output (UL MU-MIMO) has also been used in cellular communications systems (e.g., 3GPP LTE) to enhance communications system performance. UL MU-MIMO allows multiple users to transmit simultaneously on the same network resource (e.g., a time-frequency resource) with the transmissions being separated in space, e.g., on different spatial streams.

In order to support OFDMA and UL MU-MIMO, the signal power level of received signals from multiple stations at the AP receiver should be at appropriate levels. For example, for UL MU-MIMO, the power difference between the received signals from multiple stations at the time-frequency resource should be within a reasonable range. If the power difference is too large, interference from the stronger received signal will overwhelm the weaker received signal, thus making UL MU-MIMO not workable. For OFDMA, due to implementation inaccuracies, there exists interference leakage from one resource unit to another, especially for those resource units that are adjacent to each other. Therefore, it is also important to maintain the power difference in the received signals from multiple stations to be within a reasonable range to avoid the weaker received signal from being overwhelmed by the stronger received signal.

UL transmission power control has been utilized to ensure that the signal power level of the received signals from multiple stations at the AP receiver is at appropriate levels. UL transmission power control is also helpful to control interference among the overlapping basic service sets (OBSS).

In co-assigned U.S. patent application Ser. No. 14/868, 031, filed Sep. 28, 2015, entitled "System and Method for Power Control," which is hereby incorporated herein by reference, a system and method for transmit power control is provided. The system and method for transmit power control involves an AP indicating a target UL receive power, a DL transmission power, a DL bandwidth, and so on, in a trigger frame. The target UL receive power may be a desired receive power level in the UL for signals received at the AP. The DL transmission power may be a desired downlink transmission power level for a transmission made by the AP. The DL bandwidth indicates a total downlink bandwidth. The station adjusts its UL transmission power in accordance with the parameters. In IEEE contribution 11-15-0132r13, entitled "Specification Framework for TGax," which is hereby incorporated herein by reference, a trigger frame format is disclosed.

In IEEE 802.11, an Access Point (AP) periodically transmits a Beacon frame. Beacon frames may also be referred to as trigger frames. Other types of trigger frames may include a stand-alone downlink (DL) frame containing control information such as the uplink scheduling information, or a downlink frame where the control information such as the uplink scheduling information is sent together with other downlink data. The trigger frame can be in the form of a media access control (MAC) frame. The trigger frame can also be in the form of a null data packet (NDP) frame.

Figure 3:
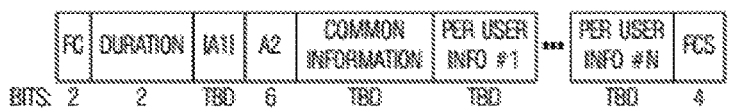
FIG. 3 illustrates a format of a trigger frame as disclosed in IEEE contribution 11-15-0132r13.

FIG. 3 illustrates a format of a trigger frame 300 as disclosed in IEEE contribution 11-15-0132r13. Trigger frame 300 includes a frame control (FC) field, a duration field, an A1 field, an A2 field, a Common Information field, up to an integer N Per User Information fields, and a frame check sequence (FCS) field. Common Information field includes information for all stations signaled in trigger frame 300, while each of the N Per User Information fields includes information for a corresponding station only. It is noted that since a target UL receive power is station dependent, it is straight forward to indicate the target UL receive power for a particular station in corresponding Per User Information fields. Target UL receive power is needed for each station signaled in the trigger frame. However, if the target UL receive power for each station is indicated in the trigger frame, it may incur a high signaling overhead. For discussion purposes, consider a situation where 6 bits are needed to indicate each target UL receive power. Then, if the trigger frame schedules 8 stations, the trigger frame needs to include 6*8=48 bits to indicate the 8 individual target UL receive powers. Therefore, there is a need to reduce the signaling overhead involved in signaling the target UL receive power.

According to an example embodiment, a reference target UL receive power (also referred to as a target UL receive power reference, a target receive power reference, and the like) is signaled to all scheduled stations and target UL receive power adjustments (also referred to as an adjustment to the reference target UL receive power, an adjustment to the target UL receive power reference, an adjustment to the target receive power reference, and the like) are signaled separately to corresponding scheduled stations. The target UL receive power adjustments may be signed values or unsigned values depending on the value of the reference target UL receive power. Since the range of power adjustments is generally smaller than the range of the target UL receive power, a smaller number of bits may be used to represent the target UL receive power adjustments. Therefore, the signaling overhead may be reduced.

Figure 4A:
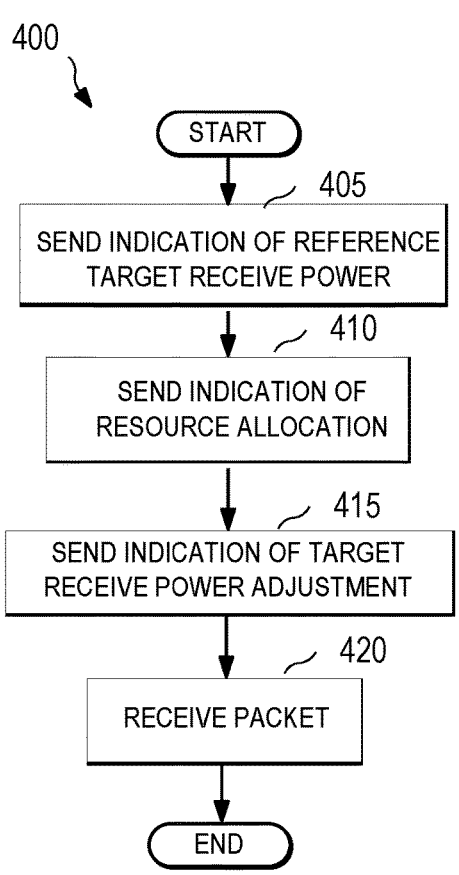
FIG. 4A illustrates a flow diagram of example operations occurring in an AP communicating with stations.

FIG. 4A illustrates a flow diagram of example operations 400 occurring in an AP communicating with stations. Operations 400 may be indicative of operations occurring in an AP as the AP communicates with stations.

Operations 400 begin with the AP sending an indication of a reference target UL receive power (block 405) (also referred to as a reference target power level indicator, a target receive power reference indicator, a reference indicator, and the like). The reference target UL receive power may be a desired receive power level in the UL for signals received at the AP. As discussed previously, the receive power level in the UL for signals received at the AP is approximately the same for all stations participating in OFDMA and/or UL MU-MIMO. The AP sends an indication of a network resource allocated for an UL transmission (block 410). In order for the station to transmit in the UL, the station needs to know the location of a network resource allocated by the AP for the UL transmission. The AP sends indications of target UL receive power adjustments (block 415) (also referred to as a target power level adjustment indicator, a target receive power adjustment indicator, an adjustment indicator, and the like). The AP may send a target UL receive power adjustment for a scheduled station. The target UL receive power adjustment is an adjustment to the target UL receive power reference for the scheduled station. The target UL receive power adjustments may be different for each scheduled station. The AP receives a packet from each scheduled station (block 420).

Figure 4B:
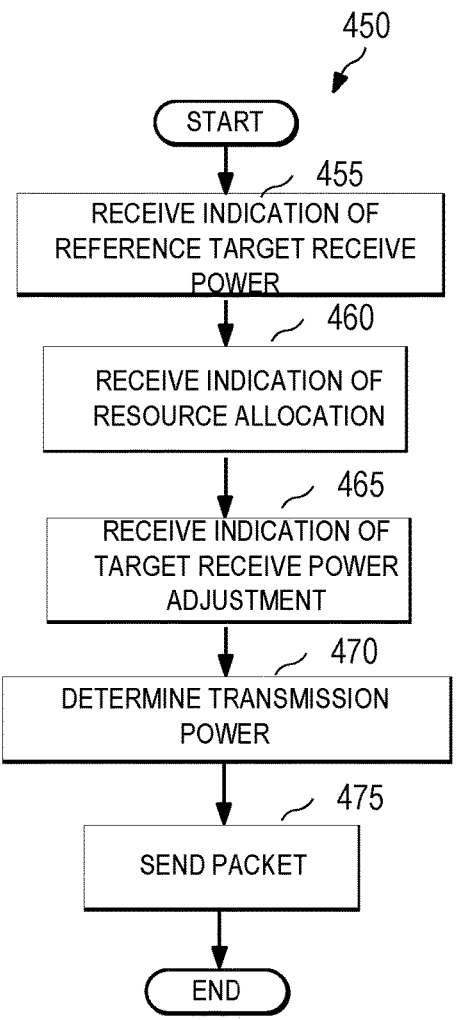
FIG. 4B illustrates a flow diagram of example operations occurring in a station communicating with an AP

FIG. 4B illustrates a flow diagram of example operations 450 occurring in a station communicating with an AP. Operation 450 may be indicative of operations occurring in a station as the station communicates with an AP.

Operations 450 begin with the station receiving an indication of a reference target UL receive power (block 455). The station receives an indication of a network resource allocated for an UL transmission (block 460). The station receives an indication of a target UL receive power adjustment (block 465). The station determines a transmit power level (or transmission power level) in accordance with the reference target UL receive power, and the target UL receive power adjustment (block 470). The station transmits a packet (block 475). The packet is transmitted at a network resource in accordance with the indication of the allocated network resource and at the transmit power level.

According to an example embodiment, a reference target UL receive power is included in a Common Information field of a trigger frame and individual target UL receive power adjustments are included in Per User Information fields of the trigger frame. Since the reference target UL receive power is intended for all scheduled stations, locating the reference target UL receive power allows all scheduled stations to receive the reference target UL receive power. Furthermore, the location of the individual target UL receive power adjustments is in Per User Information fields, allowing individual scheduled stations receive their own power adjustments.

The AP indicates power control indications (e.g., the reference target UL receive power and the target UL receive power adjustments) for different stations by utilizing the Common Information field and the Per User Information fields of a trigger frame. The Common Information field includes an indication of a reference target UL receive power and the Per User Information fields include target UL receive power adjustments for individual scheduled stations. The reference target UL receive power and the target UL receive power adjustments together indicate a target UL receive power. The station, after receiving a trigger frame, uses both the reference target UL receive power in the Common Information field and a target UL receive power adjustment in a corresponding Per User Information field to derive its target UL receive power.

In general, packet transmission between AP and station #i uses a modulation and coding scheme (MCS). As an illustrative example, AP considers the UL MCS when AP calculates a target UL receive power adjustment for station #i. When receiving a trigger frame, station #i obtains the target UL receive power for station #i by summing the reference target UL receive power (as indicated in a Common Information field) and a target UL receive power adjustment for station #i (as indicated in a Per User Information field #i).

As an illustrative example, consider a situation where an AP schedules three stations (STA1, STA2, and STA3) for uplink OFDMA and/or MU-MIMO transmission with the target UL receive power for the stations being −56 dBm, −60 dBm, and −58 dBm, respectively. The AP may set the reference target UL receive power in the Common Information field of the trigger frame to −60 dBm and the individual target UL receive power adjustments for the stations to 4 dBm, 0 dBm, and 2 dBm, respectively. Therefore, for STA1, the target UL receive power is −60 dBm+4 dBm=−56 dBm; for STA2, the target UL receive power is −60 dBm+0 dBm=−60 dBm; and for STA3, the target UL receive power is −60 dBm+2 dBm=−58 dBm.

Figure 5:
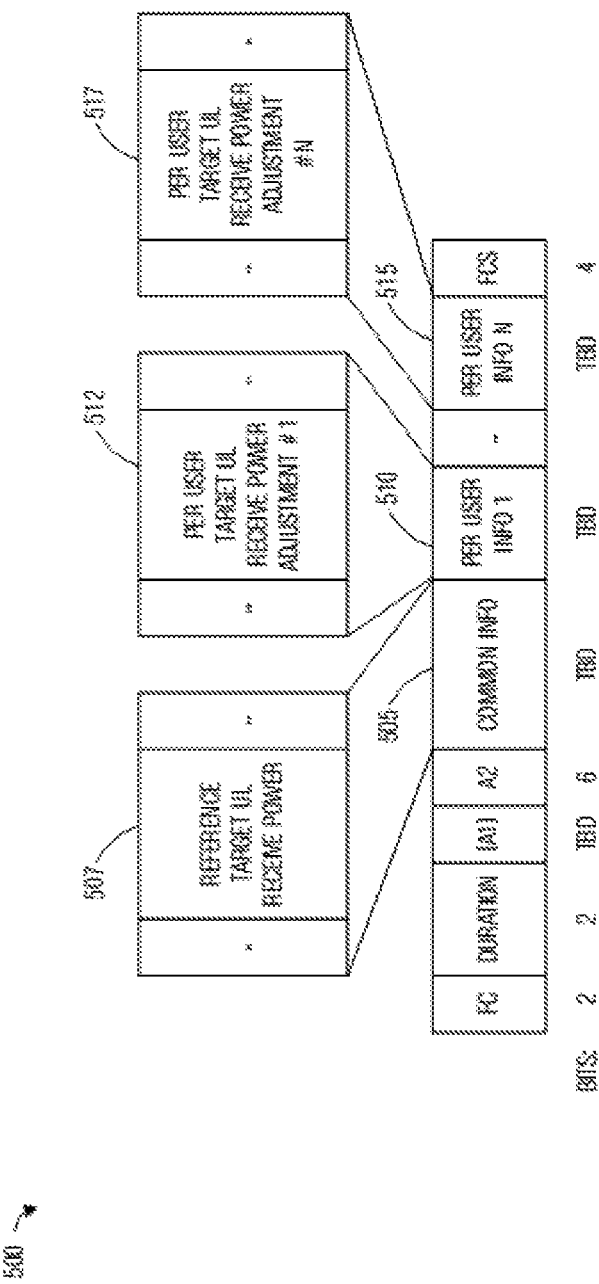
FIG. 5 illustrates a format of an example trigger frame.

FIG. 5 illustrates a format of an example trigger frame 500. Trigger frame 500 includes a Common Information field 505 that includes a reference target UL receive power 507 and an integer N Per User Information fields, such as Per User Information field #1 510 and Per User Information field #N 515. The Per User Information fields include individual target UL receive power adjustments, such as Per User Information field #1 510 includes target UL receive power adjustment 512 for station #1 and Per User Information field #N 515 includes target UL receive power adjustment 517 for station #N, for example.

The reference target UL receive power is indicated in the Common Information field and the individual target UL receive power adjustments are indicated in the Per User Information fields. Such an indication configuration reduces the total signaling overhead involved in signaling transmit power indicators. As an illustrative example, in a convention scheme 6 bits are used to indicate each target UL receive power. Therefore, to schedule 8 stations, a total of 6*8=48 bits are required in the trigger frame to indicate the target UL receive power for all 8 stations. As an illustrative example, if 6 bits are used to indicate a reference target UL receive power and 3 bits are used to indicate each target UL receive power adjustment, then to schedule 8 stations, a total of 6+3*8=30 bit are required in the trigger frame, for a 37.5% reduction in signaling overhead.

Figure 6:
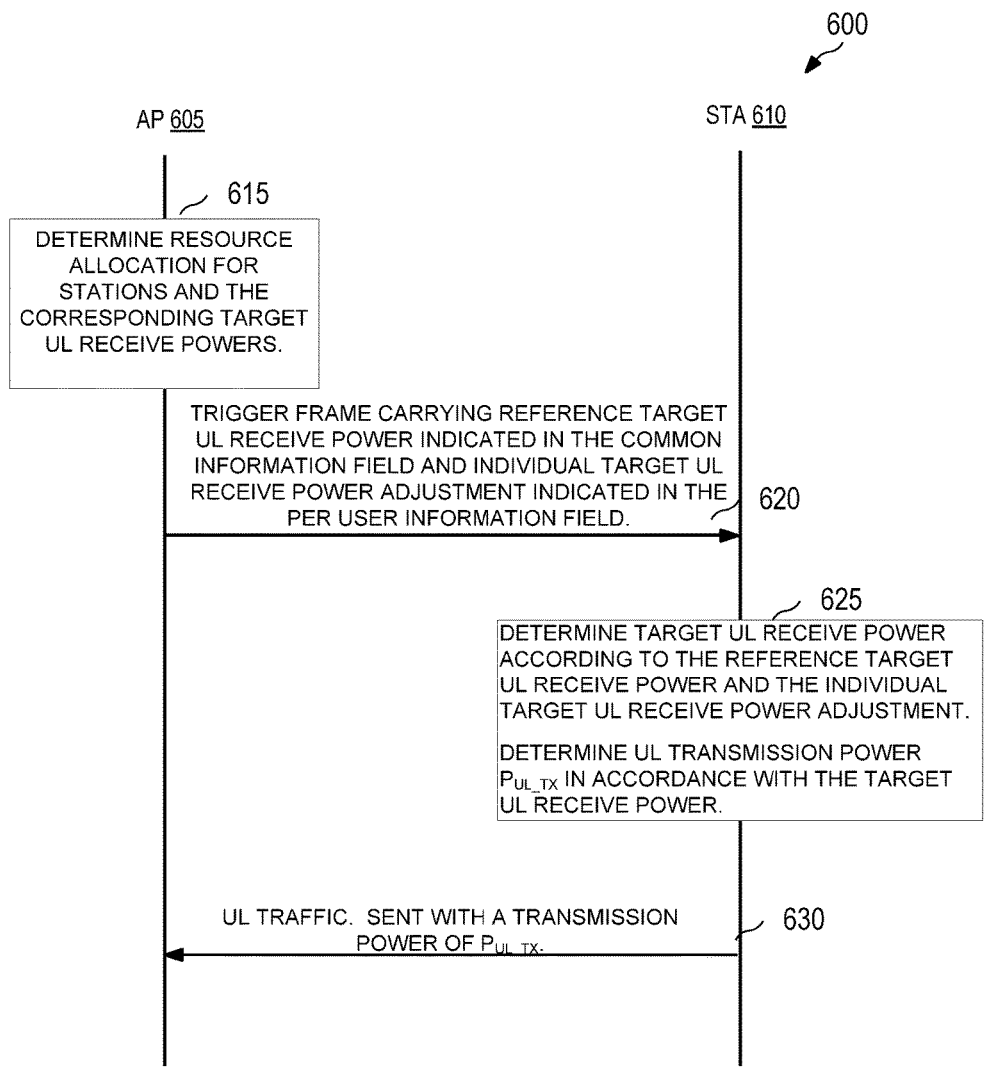
FIG. 6 illustrates a message exchange diagram highlighting messages exchanged and processing performed in devices participating in power control.

FIG. 6 illustrates a message exchange diagram 600 highlighting messages exchanged and processing performed in devices participating in power control. Message exchange diagram 600 displays messages exchanged and processing performed in an AP 605 and a station 610. AP 605 determines resource allocations for stations, as well as corresponding target UL receive powers for the stations (block 615). AP 605 sends a trigger frame carrying a reference target UL receive power in a Common Information field and individual target UL receive power adjustments in Per User Information fields (shown as event 620). An example of such a trigger frame is shown in FIG. 5. Station 610 determines a target UL receive power from the information indicated in the trigger frame and determines a UL transmission power in accordance with the target UL receive power (block 625). As an example, the target UL receive power is a summation of a reference target UL receive power indicated in the Common Information field and an individual target UL receive power adjustment indicated in a Per User Information field associated with station 610. Station 610 determines the UL transmission power $P_{UL\_TX}$ in accordance with the target UL receive power. Station 610 sends UL traffic or transmission (shown as event 630). The UL traffic is sent with a transmission power of $P_{UL\_TX}$. The UL traffic occurs at SIFS after the end of the received trigger frame.

According to an example embodiment, a reference target UL receive power is included in a first Per User Information field associated with a first station and individual target UL receive power adjustments for remaining stations are included in Per User Information fields associated with the remaining stations. In this example embodiment, the reference target UL receive power is moved from the Common Information field of a trigger frame into the first Per User Information field. Furthermore, the reference target UL receive power is equal to the target UL receive power of the first station and the target UL receive power for the remaining stations is referenced to the target UL receive power of the first station.

As an illustrative example, an AP indicates power control indications for the different stations in the trigger frame as follows:

The Per User Information field #1 (e.g., the first Per User Information field) includes an indication of the reference target UL receive power, which also serves as the target UL receive power for station #1;

The subsequent Per User Information fields (i.e., Per User Information field #i, i>1) includes an indication of an individual target UL receive power adjustment for station #i;

The reference target UL receive power (i.e., the target UL receive power for station #1) indicates the target UL receive power for station #1;

The reference target UL receive power (i.e., the target UL receive power for station #1) and the individual target UL receive power adjustment for station #i (i>1) together indicate the target UL receive power for station #i. As an example, the target UL receive power for station #i is a summation of the reference target UL receive power and the individual target UL receive power adjustment for station #i.

As an illustrative example, consider a situation where an AP schedules three stations (STA1, STA2, and STA3) for uplink OFDMA and/or MU-MIMO transmission with the target UL receive power for the stations being −56 dBm, −60 dBm, and −58 dBm, respectively. The AP may set the target UL receive power for STA1 in Per User Information field #1 to −56 dBm. Since the target UL receive power for STA1 is also the reference target UL receive power for the remaining stations, the AP sets the individual target UL receive power adjustments for the remaining two stations to −4 dBm, and −2 dBm, respectively, and indicates them in Per User Information fields associated with STA2 and STA3. Therefore, for STA2, the target UL receive power is −56 dBm+−4 dBm =−60 dBm; and for STA3, the target UL receive power is −56 dBm+−2 dBm=−58 dBm.

Figure 7:
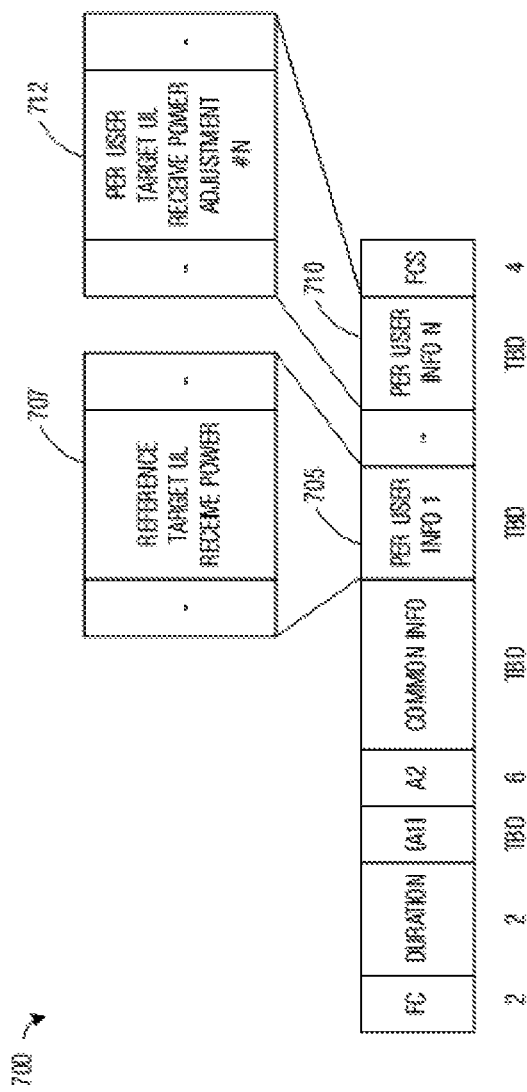
FIG. 7 illustrates a format of another example trigger frame.

FIG. 7 illustrates a format of another example trigger frame 700. Trigger frame 700 includes a first Per User Information field 705 that includes a reference target UL receive power 707 that also serves as the target UL receive power for station #1 and an integer N−1 Per User information fields, such as Per User information field #N 710. The N−1 Per User information fields include individual target UL receive power adjustments, such as Per User information field #N 710 includes target UL receive power adjustment 712 for station #N, for example.

The reference target UL receive power is indicated in the first Per User Information field and the individual target UL receive power adjustments for the remaining N−1 stations are indicated in the remaining N−1 Per User Information fields. Such an indication configuration reduces the total signaling overhead involved in signaling transmit power indicators. As an illustrative example, in a convention scheme 6 bits are used to indicate each target UL receive power. Therefore, to schedule 8 stations, a total of 6*8=48 bits are required in the trigger frame to indicate the target UL receive power for all 8 stations. As an illustrative example, if 6 bits are used to indicate a reference target UL receive power and 3 bits are used to indicate each target UL receive power adjustment, then to schedule 8 stations, a total of 6+3*7=27 bit are required in the trigger frame, for a 43.75% reduction in signaling overhead.

According to an example embodiment, in order to further reduce signaling overhead, the reference target UL receive power is included in a system information frame instead of a trigger frame, while the individual target UL receive power adjustments are included in Per User Information fields of the trigger frame. A beacon frame may be an example of a system information frame. The inclusion of the reference target UL receive power in the system information frame implies that the reference target UL receive power remains constant for at least a duration between successive system information frames, e.g., successive beacon frames. Since the reference target UL receive power is included in the system information frame, the trigger frame no longer has to include the reference target UL receive power.

The determination of the target UL receive power remains the same as discussed above. As an illustrative example, the target UL receive power for station #i is a summation of the reference target UL receive power (as indicated in a system information frame) and an individual target UL receive power adjustment associated with station #i (as indicated in a Per User Information field #i).

Figure 8:
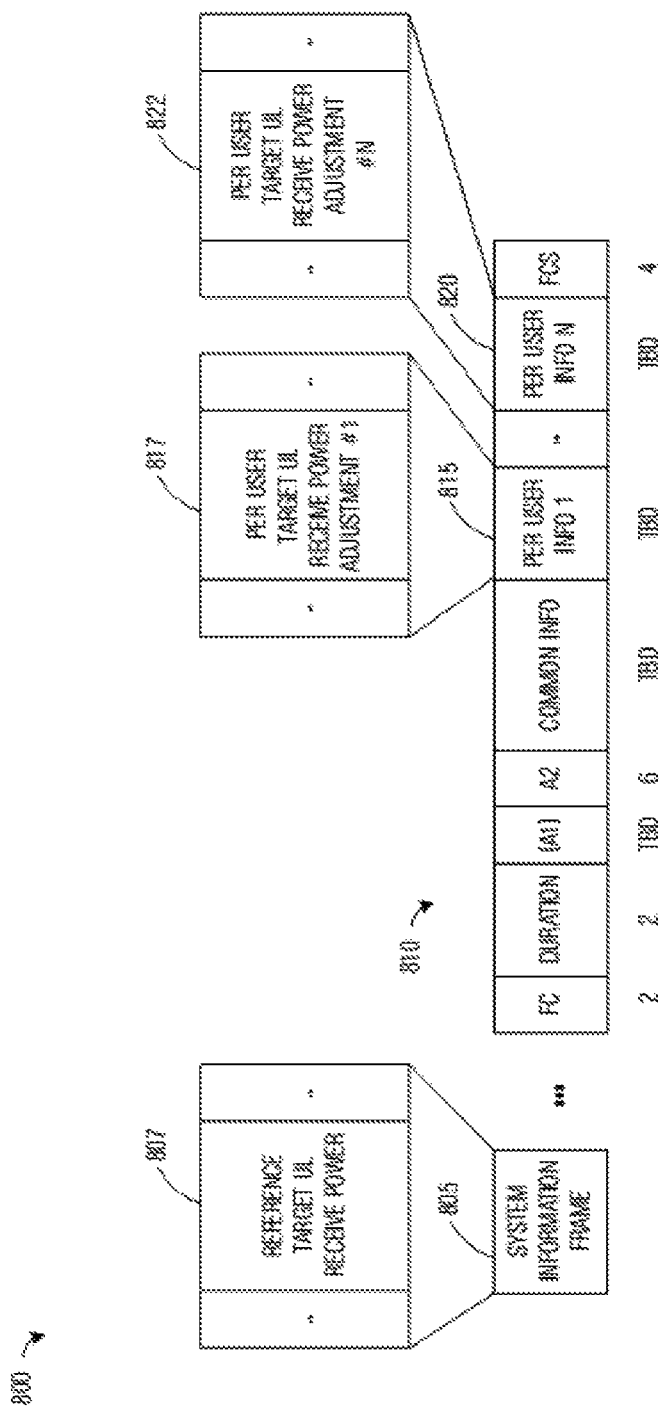
FIG. 8 illustrates a diagram of an example system information frame and an example trigger frame.

FIG. 8 illustrates a diagram 800 of an example system information frame 805 and an example trigger frame 810. System information frame 805 includes a reference target UL receive power 807. Trigger frame 810 includes N Per User Information fields, such as Per User Information field #1 815 and Per User Information field #N 820. The Per User Information fields include individual target UL receive power adjustments, such as Per User Information field #1 815 includes target UL receive power adjustment 817 for station #1 and Per User Information field #N 820 includes target UL receive power adjustment 822 for station #N, for example.

The reference target UL receive power is indicated in the system information frame and the individual target UL receive power adjustments for the stations are indicated in the Per User Information fields of a trigger frame. Such an indication configuration reduces the total signaling overhead involved in signaling transmit power indicators. As an illustrative example, in a convention scheme 6 bits are used to indicate each target UL receive power. Therefore, the schedule 8 stations, a total of 6*8=48 bits are required in the trigger frame to indicate the target UL receive power for all 8 stations. As an illustrative example, if 6 bits are used to indicate a reference target UL receive power and 3 bits are used to indicate each target UL receive power adjustment, then to schedule 8 stations, a total of 3*8=24 bit are required in the trigger frame, for a 50% reduction in signaling overhead.

According to an example embodiment, the reference target UL receive power is set to the target UL receive power of the first station. Setting the reference target UL receive power to the target UL receive power of the first station may further reduce signaling overhead by eliminating the need to include the individual target UL receive power adjustment for the first station in Per User Information field #1 since station #1 uses the reference target UL receive power received in the system information frame as its own target UL receive power.

The example embodiments presented herein may be utilized to reduce signaling overhead related to power control indication. The example embodiments presented herein enable the use of OFDMA and/or MU-MIMO on the UL, making resource utilization more efficient.

Figure 9:
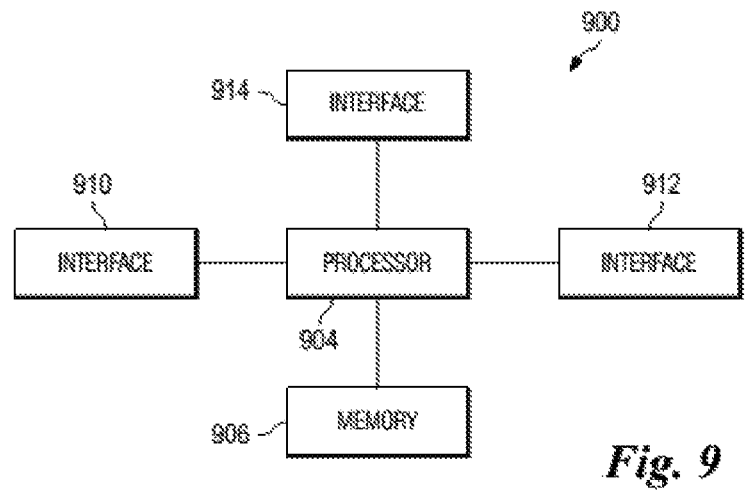
FIG. 9 illustrates a block diagram of an embodiment processing system for performing methods described herein.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
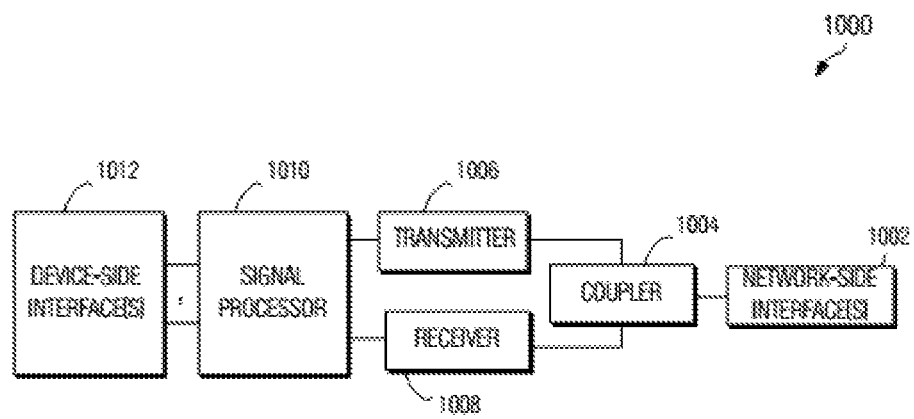
FIG. 10 illustrates a block diagram of a transceiver adapted to transmit and receive signaling over a telecommunications network.

In some embodiments, one or more of the interfaces 910, 912, 914 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 includes a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 includes one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present application. Each of these references is incorporated herein by reference in its entirety:
  IEEE contribution 11-13-0331r5, "High-efficiency WLAN", Orange, et al;
  IEEE contribution 11-13-0339r10, "High-efficiency WLAN Straw poll", Orange, et al;
  U.S. patent application Ser. No.14/868,031 (Huawei ID HW 91025413US02), "System and Method for Power Control", Zhigang Rong, et al; and
  IEEE contribution 11-15-0132r13, "Specification Framework for TGax", Intel.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method of communicating in a wireless communications system, the method comprising:
  receiving, by a station, a reference indicator indicating a target receive power reference for an access point (AP);
  receiving, by the station, an adjustment indicator indicating an adjustment to the target receive power reference;
  determining, by the station, a transmission power level in accordance with the target receive power reference and the adjustment to the target receive power reference; and
  transmitting, by the station, a packet at the transmission power level to the AP;
  wherein determining the transmission power level comprises:
  determining that the transmission power level is no less than a summation of the target receive power reference and the adjustment to the target receive power reference.

2. The method of claim 1, wherein the adjustment indicator and the reference indicator are received in a trigger frame.

3. The method of claim 2, wherein the reference indicator is received in a common information field of the trigger frame, and the adjustment indicator is received in a per user information field associated with the station.

4. The method of claim 2, wherein the station includes a first station, the target receive power reference includes a target receive power for a second station, the reference indicator is received in a per user information field associated with the second station, and the adjustment indicator is received in a per user information field associated with the first station.

5. The method of claim 4, wherein the per user information field associated with the second station corresponds to a first per user information field in the trigger frame.

6. The method of claim 1, wherein the adjustment indicator is received in a first frame, and the reference indicator is received in a second frame.

7. The method of claim 6, wherein the first frame is a trigger frame and the second frame is a system information frame.

8. A method for communicating in a wireless communications system, wherein the system comprises an access point (AP) and multiple stations, the method comprising:
  transmitting, by the AP, a reference indicator indicating a target receive power reference of the AP;
  transmitting, by the AP, an adjustment indicator indicating an adjustment to the target receive power reference for a first station; and
  receiving, by the AP, a packet from the first station, wherein a transmission power level of the packet is no less than a summation of the target receive power reference and the adjustment to the target receive power reference.

9. The method of claim 8, wherein the adjustment indicator and the reference indicator are transmitted in a trigger frame.

10. The method of claim 9, wherein the reference indicator is transmitted in a common information field of the trigger frame, and the adjustment indicator is transmitted in a per user information field associated with the first station.

11. The method of claim 9, wherein the target receive power reference includes a target receive power for a second station, wherein the reference indicator is transmitted in a per user information field associated with the second station, and wherein the adjustment indicator is transmitted in a per user information field associated with the first station.

12. The method of claim 8, wherein the adjustment indicator is transmitted in a first frame, and the reference indicator is transmitted in a second frame.

13. The method of claim 12, wherein the first frame is a trigger frame and the second frame is a system information frame.

14. The method of claim 8, further comprising:
transmitting a resource allocation indicator indicating a location of a network resource allocated to the first station for transmitting the packet.

15. A station adapted to communicate in a wireless communications system, the station comprising:
a processor; and
a computer readable storage medium storing programming for execution by the processor, the programming including instructions to configure the station to:
receive a reference indicator indicating a target receive power reference for an access point (AP),
receive an adjustment indicator indicating an adjustment to the target receive power reference,
determine a transmission power level in accordance with the target receive power reference and the adjustment to the target receive power reference, and
transmit a packet at the transmission power level to the AP;
wherein the transmission power level is no less than a summation of the target receive power reference and the adjustment to the target receive power reference.

16. An access point (AP) adapted to communicate in a wireless communications system, the AP comprising:
a processor; and
a computer readable storage medium storing programming for execution by the processor, the programming including instructions to configure the AP to:
transmit a reference indicator indicating a target receive power reference of the AP,
transmit an adjustment indicator indicating an adjustment to the target receive power reference for a station, and
receive a packet from the station, wherein a transmission power level of the packet is no less than a summation of the target receive power reference and the adjustment to the target receive power reference.

17. The AP of claim 16, wherein the reference indicator is transmitted in a common information field of a trigger frame, and the adjustment indicator is transmitted in a per user information field associated with the first station of the trigger frame.

18. The AP of claim 16, wherein the station includes a first station, the target receive power reference includes a target receive power for a second station, wherein the reference indicator is transmitted in a per user information field associated with the second station of a trigger frame, and wherein the adjustment indicator is transmitted in a per user information field associated with the first station of the trigger frame.

* * * * *